(12) United States Patent
Tokumoto (10) Patent No.: US 8,488,168 B2
(45) Date of Patent: Jul. 16, 2013

(54) IMAGE FORMING APPARATUS FOR PRINTING A PLURALITY OF LOGICAL PAGES, IMAGE FORMING APPARATUS CONTROL METHOD, AND STORAGE MEDIUM

(75) Inventor: Hirokazu Tokumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 12/896,489

(22) Filed: Oct. 1, 2010

(65) Prior Publication Data

US 2011/0102835 A1    May 5, 2011

(30) Foreign Application Priority Data

Nov. 5, 2009    (JP) .................. 2009-254320

(51) Int. Cl.
*G06F 15/00* (2006.01)
*G06F 3/12* (2006.01)
*G06K 1/00* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS 6,100,998 A * 8/2000 Nagao et al. .................... 358/1.9
8,284,445 B2 * 10/2012 Tsunoda ......................... 358/1.9

FOREIGN PATENT DOCUMENTS

JP    09-001871 A    1/1997

* cited by examiner

*Primary Examiner* — Douglas Tran
(74) *Attorney, Agent, or Firm* — Canon U.S.A., Inc., IP Division (57) ABSTRACT

A first processor converts print data of a predetermined logical page to be printed on a first print sheet into an intermediate code, and a second processor converts print data of a logical page other than the predetermined logical page to be printed on the first print sheet into an intermediate code.

7 Claims, 10 Drawing Sheets

IMAGE FORMING APPARATUS FOR PRINTING A PLURALITY OF LOGICAL PAGES, IMAGE FORMING APPARATUS CONTROL METHOD, AND STORAGE MEDIUM

BACKGROUND OF THE INVENTION

1. Field of the Invention

The present invention relates to an image forming apparatus, an image forming apparatus control method, and a storage medium.

2. Description of the Related Art

As a conventional technique to process page description language (PDL) on a page in parallel using a multi-core central processing unit (CPU), there is Japanese Patent Application Laid-Open No. 9-001871. In Japanese Patent Application Laid-Open No. 9-001871, a method is discussed in which one page is divided based on print information about a drawing area into a plurality of band areas, the divided page is successively allocated to each drawing device in units of the band in parallel, and then an image forming apparatus draws an image by the band.

Further, in recent years, in a print job, in order to print a plurality of pages generated by an application or the like on one output paper, a print layout setting to dispose the plurality of pages on one page is frequently used. When a plurality of pages is allocated on one page, print data on the one page becomes complicated, and language interpretation and rendering processing may be a load on the apparatus, thus, it consumes much time.

In Japanese Patent Application Laid-Open No. 9-001871, a method for converting print data into an intermediate code using a multi-core CPU is not discussed. Thus, high-speed intermediate code conversion utilizing the multi-core CPU cannot be executed and time is consumed in converting the intermediate code. Particularly, when complicated print data in which a plurality of pages is allocated on one page is converted into the intermediate code, time is further consumed.

SUMMARY OF THE INVENTION

The present invention is directed a technique to enable an image forming apparatus mounted with a multi-core CPU to generate an intermediate code at higher speed when an intermediate code of print data in which a plurality of pages is allocated on one page is generated.

An image forming apparatus includes a first processor configured to convert input print data into an intermediate code, a second processor which is different from the first processor and configured to convert the print data into the intermediate code, a determination unit configured to determine whether a Nup layout in which a plurality of logical pages is printed on one sheet is set to the print data, and a prediction unit configured to predict time necessary for the first processor to convert print data on the plurality of logical pages to be printed on a first print sheet into intermediate code if it is determined that the Nup layout is set by the determination unit, wherein if the time predicted by the prediction unit is longer than a time that the image forming apparatus prints one print sheet, the first processor converts print data of a predetermined logical page to be printed on the first print sheet into the intermediate code and the second processor converts print data on a logical page other than the predetermined logical page to be printed on the first print sheet into the intermediate code, and if the time predicted by the prediction unit is shorter than the time that the image forming apparatus prints one print sheet, the first processor converts print data on the plurality of logical pages to be printed on the first print sheet into the intermediate code and the second processor converts print data on the plurality of logical pages to be printed on a second print sheet into the intermediate code.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
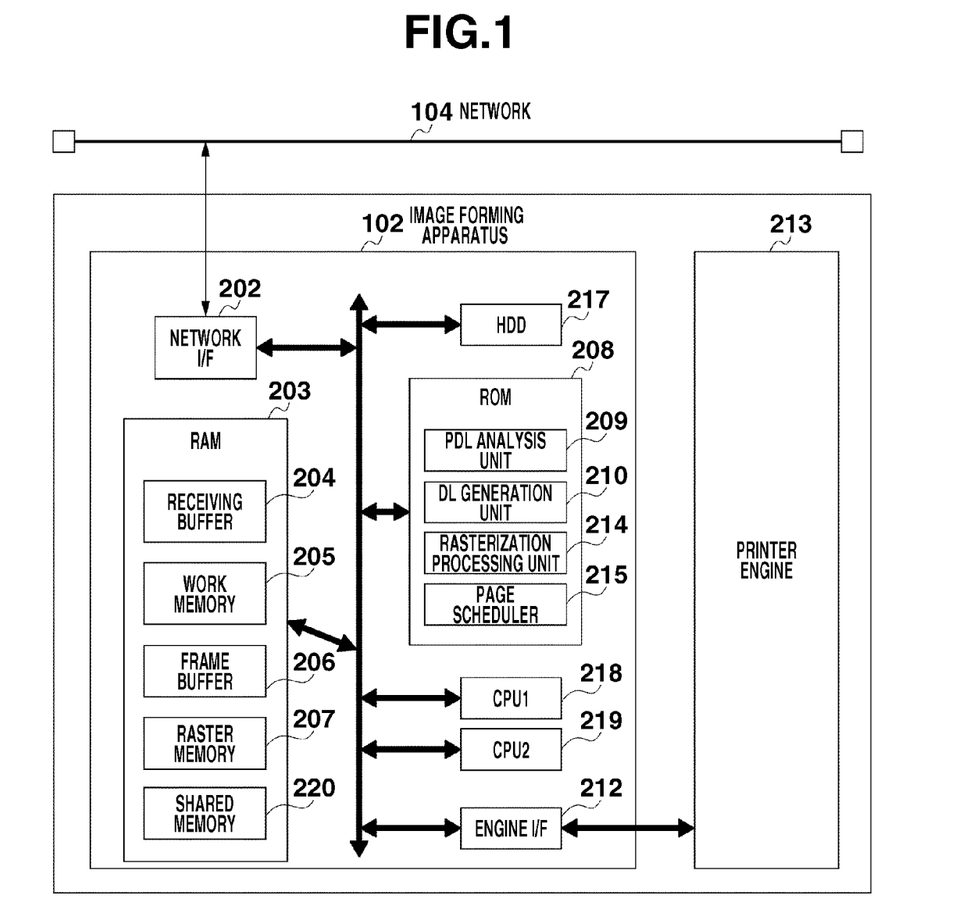
FIG. 1 illustrates an example of a system configuration of an image forming apparatus according to a first exemplary embodiment of the present invention.

FIG. 1 illustrates an example of a system configuration of an image forming apparatus 102 according to a first exemplary embodiment of the present invention. The image forming apparatus 102 illustrated in FIG. 1 includes a network interface (I/F) 202 which executes input and output of information with an external device, and receives print data transmitted from the external device. A random access memory (RAM) 203 temporarily stores various types of information. The RAM 203 includes a receiving buffer 204, a work memory 205, a frame buffer 206, a raster memory 207, and a shared memory 220. The receiving buffer 204 is a memory for storing the print data received via the network I/F 202.

The work memory 205 is temporarily used when input data, for example page description language (PDL), is converted into an intermediate code. The frame buffer 206 stores an intermediate code in a printer. The raster memory 207 stores data rasterized with an intermediate code into a raster image. The shared memory 220 can be accessed from a program in a read only memory (ROM) 208 that operates on a CPU1 218 or a CPU2 219.

The ROM 208 stores a control code of the CPU1 218 or the CPU2 219 in the image forming apparatus 102. The ROM 208 includes a PDL analysis unit 209, description language (DL) (intermediate code) generation unit 210, a rasterization processing unit 214, and a page scheduler 215. The PDL analysis unit 209 specifies that data read from the receiving buffer 204 is which the PDL among a plurality of PDLs, analyzes PDL data, and sorts out the data into predetermined processing.

The DL generation unit 210 generates an intermediate code from data analyzed in the PDL analysis unit 209 (converts into an intermediate code) and stores the intermediate code in the frame buffer 206. The rasterization processing unit 214 stores a bit map which is obtained by rasterizing the intermediate code stored in the frame buffer 206 in the raster memory 207. The page scheduler 215 requests the PDL analysis unit 209 and the DL generation unit 210 that operate on the CPU 218 and the CPU 219 to process each page of the PDL data.

The CPU1 218 which is a first processor and the CPU2 219 which is a second processor are a central processing unit (CPU) configured to execute calculation processing and control of the image forming apparatus 102. An engine I/F 212 executes input and output of a signal to and from a print engine 213. The print engine 213 forms a latent image on a photosensitive drum by a well known electrophotographic process based on image data, transfers and fixes the latent image on paper to execute print output.

The image forming apparatus 102 in the first exemplary embodiment of the present invention can print 60 sheets of paper per minute and allows printing of one sheet of paper per minute. Further, information about the print engine can be determined by firmware (not illustrated) on the image forming apparatus 102.

Figure 2:
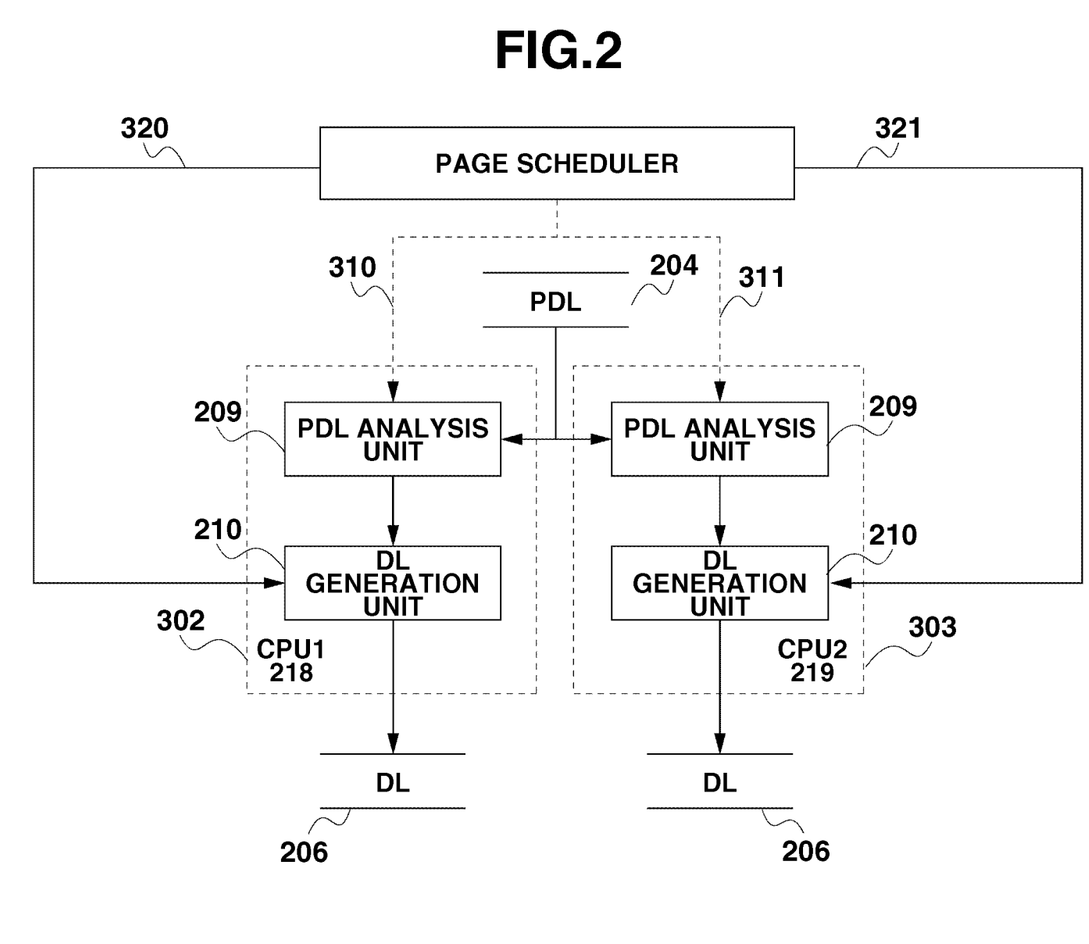
FIG. 2 illustrates an example of a module configuration of the image forming apparatus according to the first exemplary embodiment.

FIG. 2 illustrates an example of a module diagram of the image forming apparatus 102 according to the present exemplary embodiment of the present invention.

A module 302 operates on the CPU1 218, and indicates that the PDL analysis unit 209 and the DL generation unit 210 operate. A module 303 operates on the CPU2 219, and indicates that the PDL analysis unit 209 and the DL generation unit 210 operate. The page scheduler is executed by the CPU1 218, the CPU2 219, or a third CPU other than these CPU.

Control 310 is issued from the page scheduler to the PDL analysis unit 209 on the CPU1 218. Control 311 is issued from the page scheduler to the PDL analysis unit 209 on the CPU2 219. Control 320 is issued from the page scheduler to the DL generation unit 210 on the CPU1 218. Control 321 is issued from the page scheduler to the DL generation unit 210 on the CPU2 219. These pieces of control are executed by function call, inter-process communication, and the like.

The PDL analysis unit 209 that operates on the CPU1 218 complies with the control 310 from the page scheduler 215 to execute reading processing of the PDL data stored in the receiving buffer 204. The DL generation unit 210 that operates on the CPU1 218 executes processing by the control 320 from the page scheduler 215 with using data delivered from the PDL analysis unit 209 to stores DL in the frame buffer 206. The PDL analysis unit 209 and the DL generation unit 210 on the CPU2 219 also execute similar processing. By such the module configuration, page parallel processing of the PDL is realized. The PDL processing refers to processing to convert the PDL into an intermediate code. Raster image processor (RIP) processing refers to processing to draw a raster image based on the intermediate code.

Figure 3:
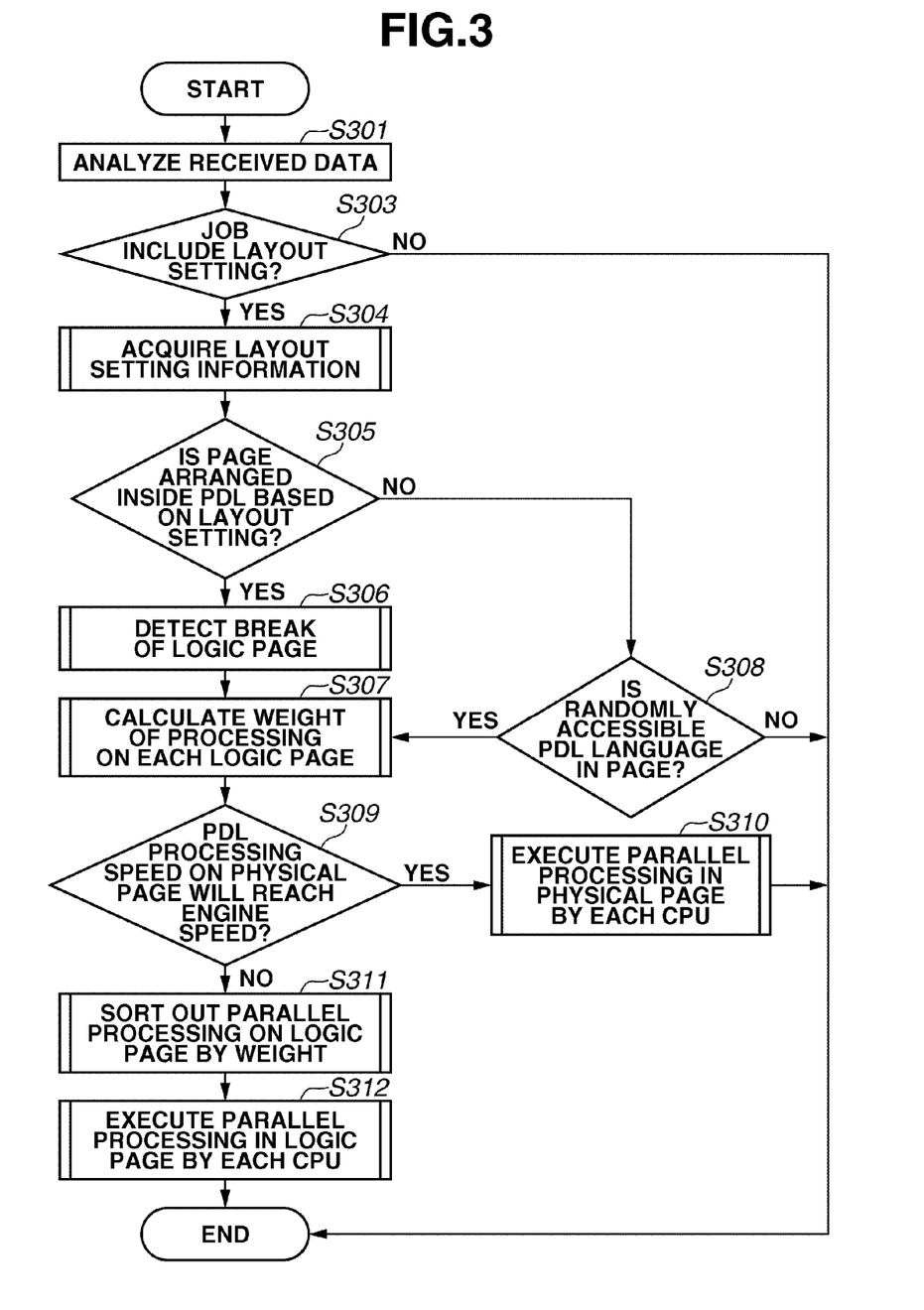
FIG. 3 is a flowchart illustrating paralleling of PDL processing according to the first exemplary embodiment.

FIG. 3 is a flowchart illustrating print processing according to the present exemplary embodiment. The following processing is an image forming apparatus control method to be executed by a page scheduler.

First, in step S301, data (e.g., PDL) transmitted from a personal computer (PC) or the like connected to the network 104 is received by the network I/F 202 via the network 104 and stored in the receiving buffer 204. Next, in step S303, the page scheduler 215 determines (confirm) whether a layout setting is included in the received data.

Data (print data) including the layout setting is data in which a plurality of logical pages is arranged on one page to be fitted into one page in order to print the plurality of logical pages on one sheet of printing paper (physical page). This layout setting is referred to as a Nup layout setting. For example, when data in which the Nup layout setting is included is printed, examples 501 and 502 illustrated in FIG. 6 can be printed.

If the layout setting is not included in the received data (NO in step S303), paralleling processing is not particularly executed and the received data is handled as normal printing processing. If the layout setting is included in the received data (YES in step S303), the processing proceeds to step S304. In step S304, layout setting information in the received data is acquired.

Next, the processing proceeds to step S305. In step S305, it is determined whether page is already arranged inside the PDL based on the layout setting. More specifically, on a job in which four pages are allocated on one page at an application level to print it, if page allocation is already performed when the PDL data is generated on the host PC side, it is determined that the page is already arranged inside the PDL (YES in step S305). In step S306, a break of each logical page is detected. When four pages are arranged on one page by the image forming apparatus 102, it is determined that the page is not arranged inside the PDL.

When the page is not yet arranged inside the PDL (NO in step S305), the processing proceeds to step S308. In step S308, it is determined whether the PDL can randomly be accessed by page. If it cannot randomly be accessed (NO in step S308), the received data is handled as normal printing processing without executing paralleling processing particularly. It is because a break of each page (head of each page) cannot be interpreted from data, the layout setting cannot be executed. If it can randomly be accessed (YES in step S308), the processing proceeds to step S307.

In step S307, weight of processing of each logical page is calculated. More specifically, when each logical page is processed, the CPU 218 or the CPU 219 calculates a predicted value of time to consume in converting the PDL into an intermediate code. Next, the processing proceeds to step S309. In step S309, it is determined whether a PDL processing speed on a physical page will reach an engine speed of a printing device in the present exemplary embodiment.

If it is predicted that the PDL processing speed satisfies the engine speed of the printing device (YES in step S309), the processing proceeds to step S310. In step S310, each CPU executes parallel processing at the physical page level. Then, the parallel processing ends. On the other hand, if it is predicted that the PDL processing speed does not satisfy the engine speed of the printing device (NO in step S309), the PDL processing speed needs to be accelerated. Thus, the processing proceeds to step S311, and parallel processing on the logical page is sorted out by the predicted value of PDL processing time.

Figure 6:
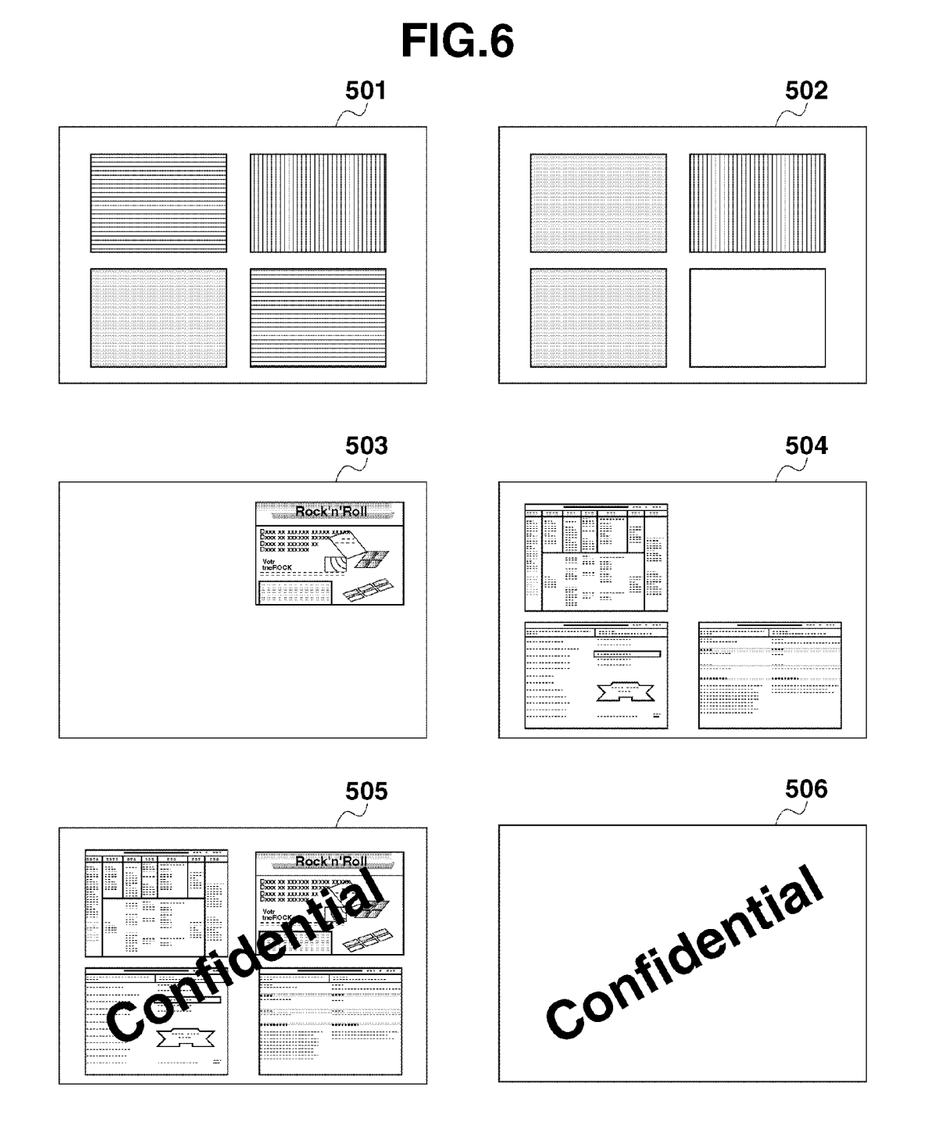
FIG. 6 illustrates an example of printed data according to the first exemplary embodiment.

For example, in printed data illustrated in FIG. 6, the examples 501 and 502 are few in number of objects drawn in a page and a command itself is relatively simple. Accordingly, when the logical pages for four pages are combined, it is predicted that the PDL processing time ends without consuming one second. The PDL processing ends faster than the engine speed (printing raster image for one page on one sheet of printing paper does not consume one second). Thus, the PDL processing does not make the print engine wait.

In other words, the predicted value is shorter than time to be consumed by the print engine to print one sheet. Accordingly, this is the case to proceed to step S310. The processing is paralleled not in logical page but in physical page. The CPU is not occupied more than necessary, and can prepare for PDL processing on the latter half page. The paralleling in physical page is, for example in print data to which a Nup layout is set, to sort a first page (physical page) to be printed on first printing paper into the CPU 218 which serves as the first processor. Further, the paralleling in physical page is to sort a second page (physical page) to be printed on second printing paper into the CPU 219 which serves as the second processor.

On the other hand, for example, as examples 503 and 504, in a case in which data include a plurality of complicated objects such as a character, a graphic, and an image, when the logical pages for four pages are combined, the PDL processing consumes 10 seconds or longer. In such the data (printing raster image for one page on one sheet of the printing paper consumes one second), the page scheduler 215 determines that processing time on the PDL processing unit is slower than the engine speed. Thus, this is the case to proceed to step S311 in which the PDL processing is paralleled by logical page.

In other words, the predicted value is longer than time to be consumed by the print engine to print one sheet. The paralleling in logical page allows a page to be output without interfering with the speed of the print engine 213 owing to slow processing of the PDL analysis unit 209. Then, the processing proceeds to step S312, and each CPU executes the PDL processing in parallel by logical page. The above description is a series of processing in paralleling of the PDL processing.

Figure 4:
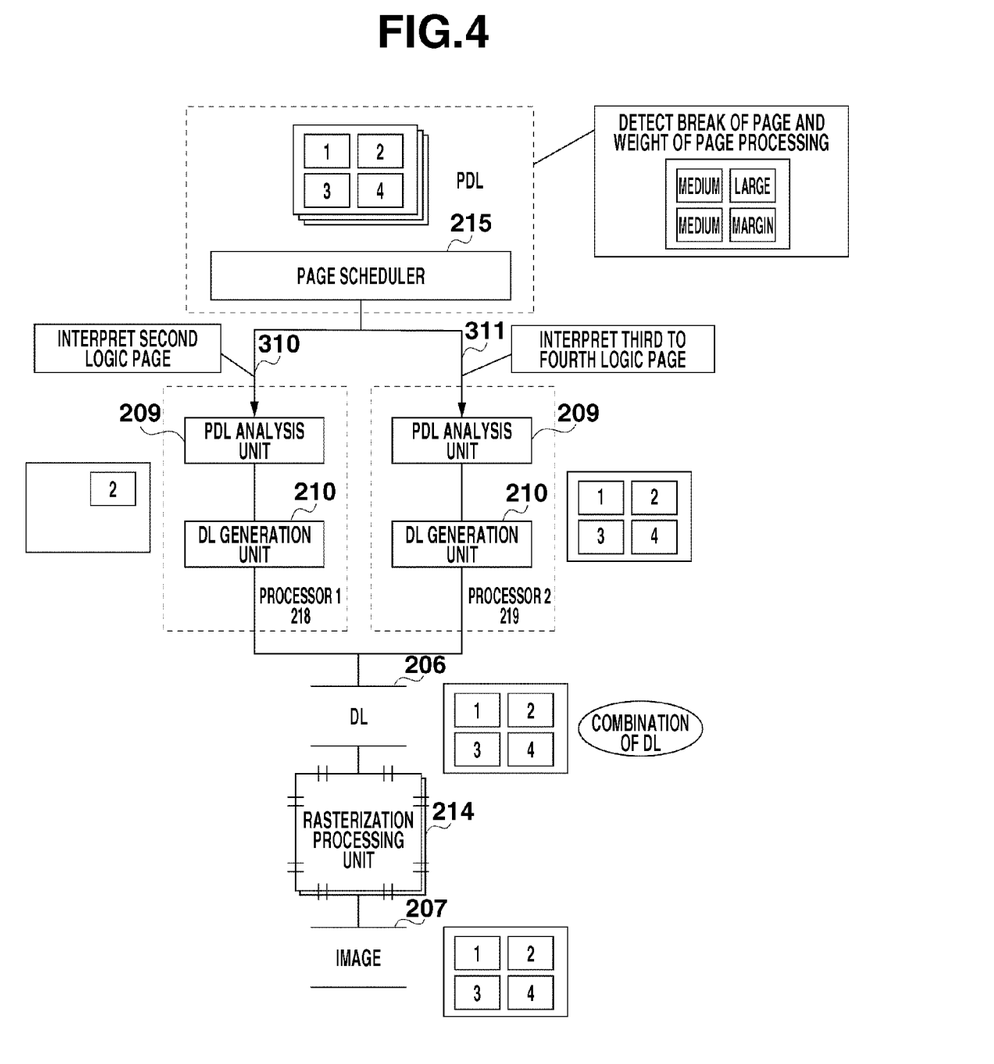
FIG. 4 illustrates an example of a module configuration of the image forming apparatus according to the first exemplary embodiment.

Referring to FIG. 4, a method for executing PDL processing in parallel by logical page will be described. FIG. 4 illustrates an example of a module configuration of the image forming apparatus 102 according to the first exemplary embodiment. The page scheduler 215 operates on the processor 1, the processor 2, or a central processing unit other than the processors 1 and 2, and detects a break of page and the predicted value of PDL processing time of page processing. The control 310 is issued from the page scheduler to the PDL analysis unit 209 on the processor 1 218. The control 311 is issued from the page scheduler to the PDL analysis unit 209 on the processor 2 219.

The PDL analysis unit 209 operating on the processor 1 218 complies with the control 310 from the page scheduler 215 to execute interpretation of a second page as a predetermined logical page which is determined that the predicted value of PDL processing time of page processing is high. The PDL analysis unit 209 executes reading processing of PDL data stored in the receiving buffer 204. The DL generation unit 210 operating on the processor 1 218 executes processing by the control 320 from the page scheduler 215 and data delivered from the PDL analysis unit 209, and stores the DL in the frame buffer 206. The PDL analysis unit 209 and the DL generation unit 210 on the processor 2 219 also execute similar processing.

Figure 5:
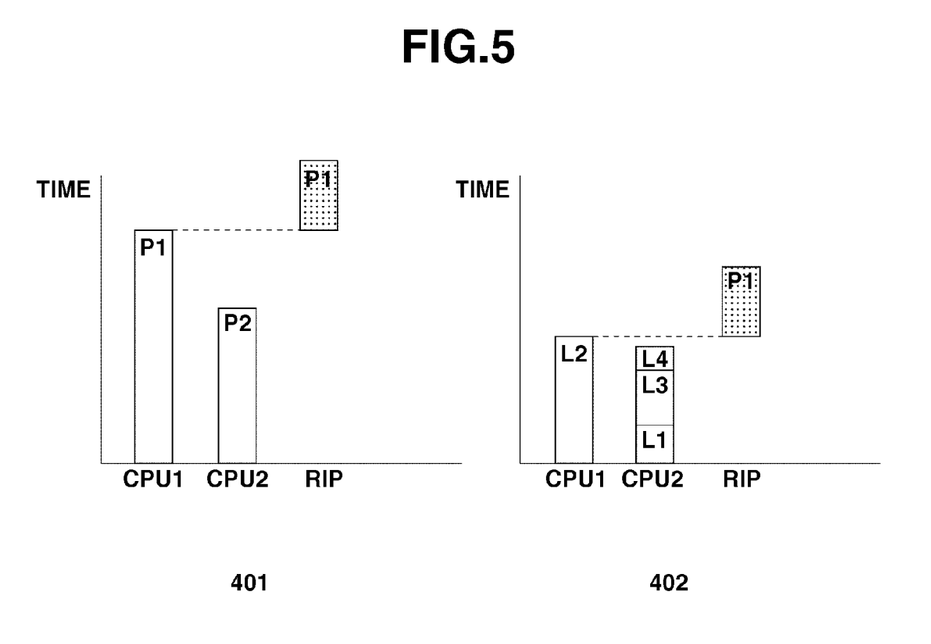
FIG. 5 illustrates an example of PDL processing time according to the first exemplary embodiment.

The processor 1 and the processor 2 store the DL in the same frame buffer 206, execute image rasterization by the rasterization processing unit 214, and then store the rasterized image in the image buffer 207. The processor 2 complies with control 311 from the page scheduler 215 and controls the processing of logical pages (first page, third page, and fourth page) other than the logical page sorted out into the processor 1. For example, as illustrated in FIG. 5, processing time will be averaged (so as to be small in difference) for each processor in the whole logical page processing. In other words, the processing time of each processor is nearly equal with each other. By such the module configuration, page parallel processing of the PDL is realized.

FIG. 5 illustrates an example of PDL processing time according to the first exemplary embodiment. An example 401 illustrates processing time when page processing is simply assigned to the processor 1 and the processor 2 by physical page. In RIP processing, image rasterization of a display list is started after generation processing of the display list is completed by the processor 1.

An example 402 illustrates processing time when page processing is assigned to the processor 1 and the processor 2 by logical page as in the present exemplary embodiment. Page interpretation processing of a first physical page can be sorted out into the processor 1 and the processor 2 by the processing to assign the page processing in logical page. Thus, in the image rasterization of the display list (drawing processing), end of generation processing of the display list is accelerated and print performance can be improved.

FIG. 6 illustrates an example of printed data according to the first exemplary embodiment. The examples 501 and 502 are data in which a drawing command itself on a logical page is relatively simple as in the first exemplary embodiment, and a load of page interpretation processing itself is not relatively large, so that the engine speed is exercised even if the logical page is not divided. In such the data, division the logical page is not executed and processing is executed by simply dividing by the physical page and assigning each processor.

The examples 503 and 504 are data in which a drawing command itself on the logical page is relatively complicated, so that division of the logical page is effective. The present invention will have logic in which page interpretation in the example 503 is assigned to the processor 1, and page interpretation in the example 504 is assigned to the processor 2.

On the other hand, in data such as example 505 (print data to which a stamp is set), the page scheduler 215 detects the number of logical pages, and then, calculates it as another logical page and supplement data. For example, in a layout in which four logical pages are allocated to one physical page, such the supplement data (stamp data) is considered as logical page data on a fifth final page and handled. In data as the example 505, it is necessary to assign the example 503 to the processor 1 218, the example 504 to the processor 2 219, and page processing in an example 506 to the processor 1 218 which completed DL generation processing ahead of the other. Then, the DL is combined by the frame buffer 206 and rendering of the physical page is executed by the rasterization processing unit 214.

Figure 7:
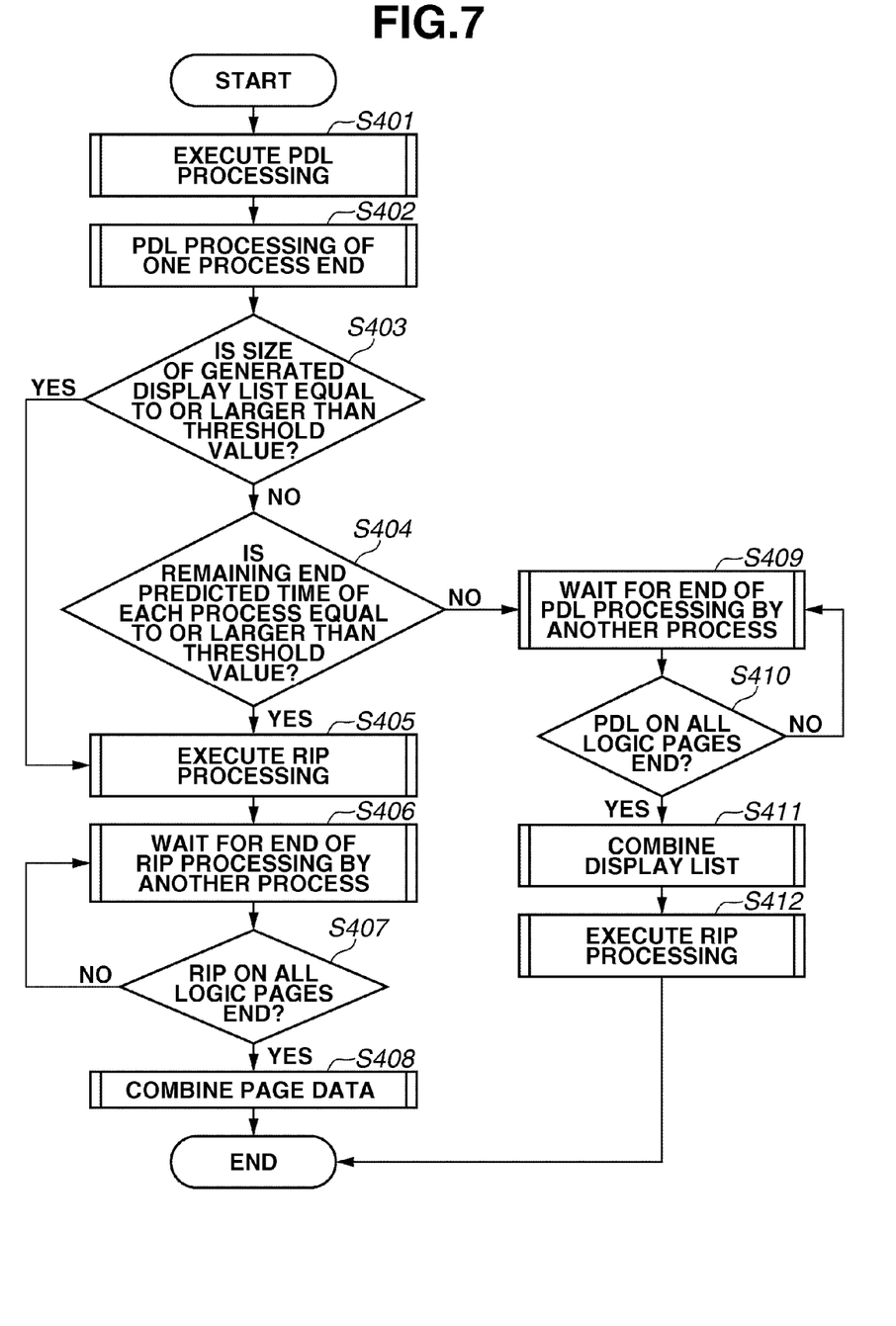
FIG. 7 is a flowchart illustrating paralleling of rendering processing according to another exemplary embodiment.

FIG. 7 is a flowchart illustrating printing processing according to the present exemplary embodiment. The following processing is executed by the page scheduler 215. First, in step S401, page interpretation processing of the PDL is executed. Next, in step S402, upon completion of PDL processing in a first process as a trigger, the processing proceeds to step S403. At this time, a process other than the first process (e.g., second processor) is in process of conversion of print data into an intermediate code.

In step S403, it is determined whether a size of a display list generated by interpreting the PDL in the completed process is equal to or larger than an internally possessed threshold value.

When the size exceeds the threshold value, fallback occurs. Thus, drawing is executed twice to the intermediate code that the first processor converted, so that drawing time is increased.

If the size is equal to or larger than the threshold value (YES in step S403), when the display list is combined with a display list to be generated by the processor 2, a size of the combined display list may exceed a size of a storable buffer area. Thus, in step S405, RIP processing is executed in advance. Accordingly, rendering is not needed to be executed twice based on the same display list.

If the size is under the threshold value (NO in step S403), the processing proceeds to step S404. In step S404, it is determined whether predicted remaining end time of each process is equal to or larger than a threshold value. If the predicted remaining end time is equal to or larger than the threshold value (a case drawing does not keep pace with the engine speed) (YES in step S404), process end waiting time is large and waiting time causes a loss. Thus, in order to eliminate the loss, the processing proceeds to step S405. Then, the RIP processing (drawing processing) is started in advance. A raster image which is subjected to the RIP processing and drawn in advance is a first raster image.

Next, the processing proceeds to step S406 to wait for end of the RIP processing by another process. When a stamp is set to the print data, during waiting, the first processor may execute processing to convert the print data of the stamp into an intermediate code.

Completion of the RIP processing by another process is used as a trigger, the processing proceeds to step S407, and it is determined whether the RIP processing is completed on all the logical pages. If the RIP processing is not completed on all the logical pages (NO in step S407), the processing returns to step S406, and waits for completion of the RIP processing by another process. A raster image drawn based on the intermediate code generated by another process (e.g., processor 2) is a second raster image.

If the RIP processing is completed on all the logical pages (YES in step S407), the processing proceeds to step S408. In step S408, two raster images of the first raster image and the second raster image are combined and a series of RIP parallel processing ends. In step S404, if the predicted remaining end time is not equal to or larger than the threshold value (NO in step S404), the processing proceeds to step S409 and waits for completion of the PDL processing by another process.

Next, the processing proceeds to step S410. It is determined whether the PDL processing is completed on all the logical pages. If the processing is not completed on all the logical pages (NO in step S410), the processing returns to step S409 and waits for completion of the PDL processing by another process (wait without drawing the intermediate code converted by the first process). If the processing is completed on all the logical pages (YES in step S410), the processing proceeds to step S411, and intermediate codes of two display lists (intermediate code) converted by two processors are combined.

Next, the RIP processing is executed together at the physical page level and a series of parallel processing ends. During waiting for completion of the PDL processing in another process, when a stamp is set to the print data, the first processor may convert the intermediate code of the stamp.

A reason to combine display lists is because a raster image can be generated earlier than processing to combine the first raster image and the second raster image drawn in advance to generate a raster image. However, if the predicted remaining end time exceeds the threshold value (drawing does not keep pace with the engine speed), even if time is slightly lost, a raster image is drawn in advance in time for printing.

Figure 8:
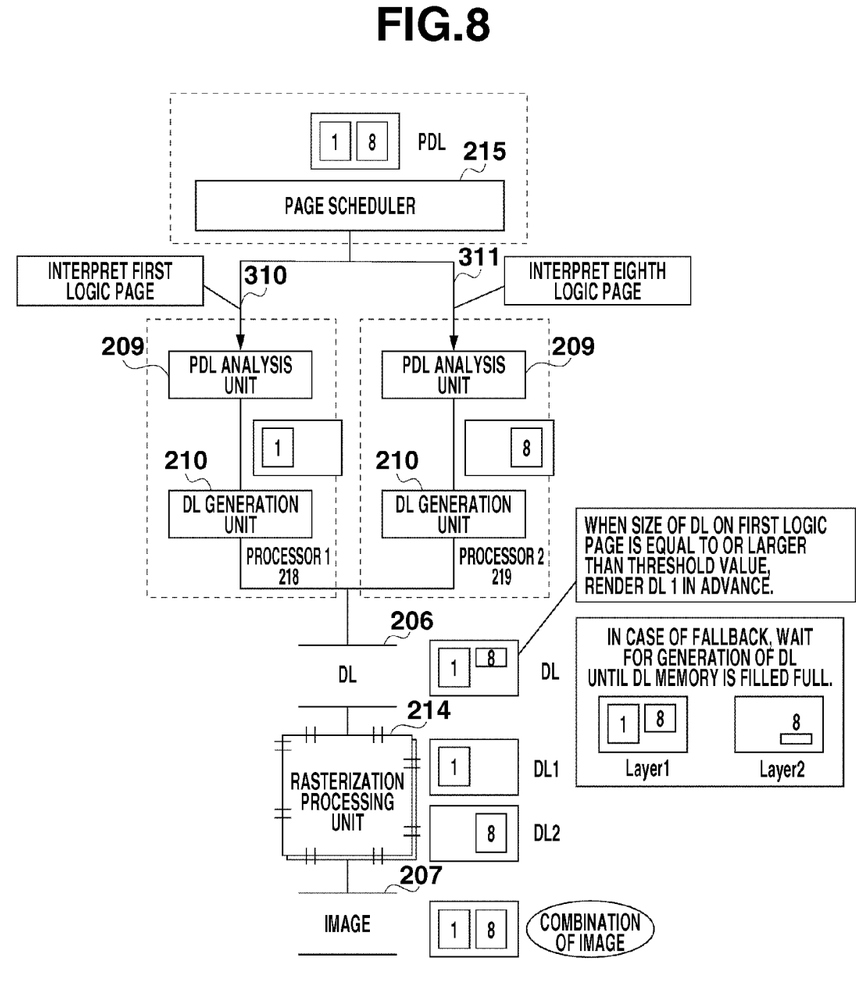
FIG. 8 illustrates an example of a module configuration of an image forming apparatus according to another exemplary embodiment.

FIG. 8 illustrates an example of a module configuration of an image forming apparatus 102 according to another exemplary embodiment. A page scheduler 215 operates on a processor 1, a processor 2, or a central processing unit other than the processors 1 and 2, and detects a break of page and the predicted value of PDL processing time of page processing. Control 310 is issued from the page scheduler to a PDL analysis unit 209 on the processor 1 218. Control 311 is issued from the page scheduler to a PDL analysis unit 209 on the processor 2 219.

The PDL analysis unit 209 operating on the processor 1 218 complies with the control 310 from the page scheduler 215 to execute interpretation of a first page on a logical page. The PDL analysis unit 209 executes reading processing of PDL data stored in a receiving buffer 204. A DL generation unit 210 operating on the processor 1 218 executes processing by control 320 from the page scheduler 215 and data delivered from the PDL analysis unit 209, and stores the DL in a frame buffer 206. The PDL analysis unit 209 and the DL generation unit 210 on the processor 2 219 also execute similar processing.

When DL generation is completed by the processor 1 218, it is determined whether a size of the DL is equal to or larger than a threshold value. If the size is equal to or larger than the threshold value, rendering processing is executed only on a first page in the logical page in advance by a rasterization processing unit 214 to store in an image buffer 207. Subsequently, rendering processing on an eighth page in the logical page is executed by the rasterization processing unit 214 directly after DL generation is completed by the processor 2 219, and then the image buffer 207 combines raster images.

Figure 9:
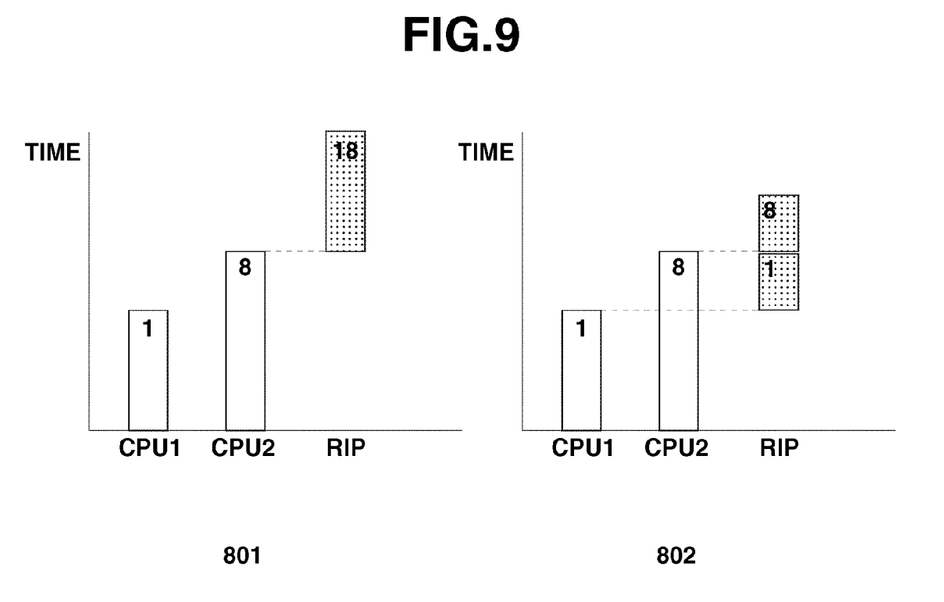
FIG. 9 illustrates an example of rendering processing time according to another exemplary embodiment.

FIG. 9 illustrates an example of RIP processing time according to another exemplary embodiment. In an example 801, image rasterization processing is executed together on the physical page in a state in which generation of DL from each processor is simply waited. An example 802 illustrates processing time when the RIP processing is executed in advance for each physical page. When a difference in end time between respective processors is large or a size of the DL generated by one processor is equal to or larger than a threshold value, the logical page is subjected to RIP processing in advance without waiting for DL generation, thus, waiting time is shortened and print performance can be improved.

Figure 10:
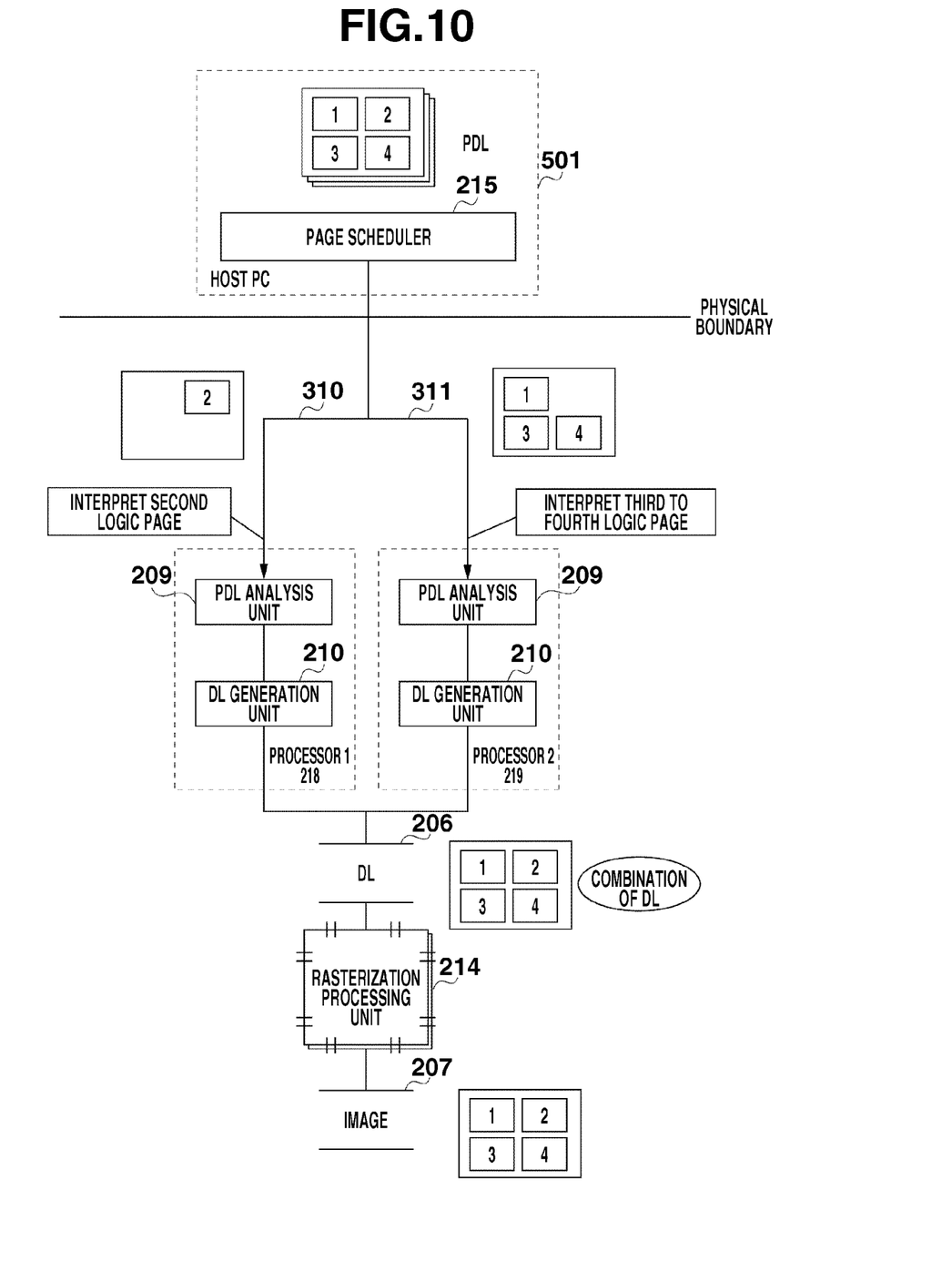
FIG. 10 illustrates an example of a module configuration of an image forming apparatus according to a last exemplary embodiment.

FIG. 10 illustrates an example of a module configuration of an image forming apparatus 102 according to a last exemplary embodiment. A page scheduler 215 operates on a host PC 501 which serves as a central processing unit as a driver application. The page scheduler 215 on the host PC first determines whether to divide a page and execute parallel processing by a controller.

On the other hand, for example, as the examples 503 and 504, in a case in which data include a plurality of complicated objects such as a character, a graphic, and an image, when the logical pages for four pages are combined, the PDL processing consumes 10 seconds or longer. In such the data, the page scheduler 215 determines that processing time of a PDL processing unit is slower than an engine speed. Thus, it is regarded as a case to proceed to step S311 in which the PDL processing is paralleled by logical page. Next, if it is determined that page paralleling processing is executed by logical page, it is determined whether to be executed the processing on the host PC or the controller.

A determination condition is to determine from a spec ratio of machines between the host PC and the controller, or a task operation ratio between the host PC and the controller. If machine performance is high in the host PC and another task is not operated on the host PC, page division is executed on the host PC side. At this time, a break of page and a predicted value of the PDL processing time of page processing are detected to calculate a unit to divide a laid out page and which logical page to be allocated to each processor on the controller.

Control 310 is issued from the page scheduler to a PDL analysis unit 209 on a processor 1 218. Control 311 is issued from the page scheduler to a PDL analysis unit 209 on a processor 2 219. A control command in these control 310 and control 311 is executed over a physical boundary. The PDL analysis unit 209 operating on the processor 1 218 complies with the control 310 from the page scheduler 215 to execute interpretation of a second page of a logical page which is determined that the predicted value of PDL processing time of page processing is large. The PDL analysis unit 209 executes reading processing of PDL data stored in a receiving buffer 204.

A DL generation unit 210 operating on the processor 1 218 executes processing by control 320 from the page scheduler 215 and data delivered from the PDL analysis unit 209, and stores the DL in a frame buffer 206. The PDL analysis unit 209 and the DL generation unit 210 on the processor 2 219 also execute similar processing. The processor 1 and the processor 2 store the DL in the same frame buffer 206, execute image rasterization by a rasterization processing unit 214, and then store the rasterized image in an image buffer 207.

The processor 2 complies with the control 311 from the page scheduler 215 and controls processing of logical pages other than pages allocated to the processor 1. Processing time will be averaged for each processor in the whole logical page processing. By such the module configuration, page parallel processing of the PDL is realized.

In each exemplary embodiment described above, two analysis units are realized by two processors. However, two or more analysis units may be realized. In this case, a third processor other than the first processor and the second processor is required.

Further, in each exemplary embodiment described above, two analysis units are realized using two CPUs. However, two analysis programs may be executed using one CPU of a multi-core processor. In this case, each of the analysis programs is executed using each core processor. The core processor refers to an assembly that is operated by combining a command issue unit, a calculation unit, and the like in a processor. The multi-core processor refers to a processor which includes a plurality of core processors.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-254320 filed Nov. 5, 2009, which is hereby incorporated by reference herein in its entirety.

What is claimed is:

1. An image forming apparatus comprising:
 a first processor configured to convert input print data into an intermediate code;
 a second processor which is different from the first processor and configured to convert the print data into the intermediate code;
 a determination unit configured to determine whether a Nup layout in which a plurality of logical pages is printed on one sheet is set to the print data; and
 a prediction unit configured to predict a time necessary for the first processor to convert print data on the plurality of logical pages to be printed on a first print sheet into intermediate code if it is determined that the Nup layout is set by the determination unit,
 wherein if the time predicted by the prediction unit is longer than a time that the image forming apparatus prints one print sheet, the first processor converts print data of a predetermined logical page to be printed on the first print sheet into the intermediate code and the second processor converts print data on a logical page other than the predetermined logical page to be printed on the first print sheet into the intermediate code, and if the time predicted by the prediction unit is shorter than the time that the image forming apparatus prints one print sheet, the first processor converts print data on the plurality of logical pages to be printed on the first print sheet into the intermediate code and the second processor converts print data on the plurality of logical pages to be printed on a second print sheet into the intermediate code.

2. The image forming apparatus according to claim 1, wherein a difference between the time necessary for the first processor to convert the print data on the predetermined logical page to be printed on the first print sheet into the intermediate code and a time necessary for the second processor to convert the print data on the logical page other than the predetermined logical page to be printed on the first print sheet into the intermediate code is small.

3. The image forming apparatus according to claim 1, further comprising:
 in a case where the first processor converts the print data on the predetermined logical page to be printed on the first print sheet into the intermediate code and the second processor converts the print data on the logical page other than the predetermined logical page to be printed on the first print sheet into the intermediate code,
 a drawing unit configured to start drawing processing based on the intermediate code generated by the first processor without waiting for the second processor to complete converting the print data into the intermediate code if a size of the intermediate code converted by the first processor is equal to or larger than a threshold value, and to start drawing processing based on the intermediate code generated by the second processor if conversion of the print data is completed by the second processor and the intermediate code is generated;
 a raster image combination unit configured to combine a first raster image drawn based on the intermediate code generated by the first processor and a second raster image drawn based on the intermediate code generated by the second processor if drawing processing by the drawing unit is completed; and
 a print engine configured to execute output based on the raster image combined by the combination unit.

4. The image forming apparatus according to claim 1, further comprising an intermediate code combination unit configured to predict a remaining time necessary for the second processor to complete converting the print data into the intermediate code if the first processor completes converting the print data into the intermediate code, to wait for completion of conversion into the intermediate code by the second processor without drawing the intermediate code converted by the first processor if the predicted remaining time is equal to or smaller than a threshold value, and to combine the intermediate code converted by the first processor and the intermediate code converted by the second processor when conversion into the intermediate code by the second processor is completed.

5. The image forming apparatus according to claim 1, wherein, if the Nup layout is set on the print data and a stamp is also set thereon, either processor which completes converting the print data on the logical page into the intermediate code in advance between the first processor and the second processor converts print data of the stamp into an intermediate code.

6. A method for controlling an image forming apparatus, the method comprising:
　causing a first processor to convert input print data into an intermediate code;
　causing a second processor which is different from the first processor to convert the print data into the intermediate code;
　causing a determination unit to determine whether a Nup layout in which a plurality of logical pages is printed on one sheet is set to the print data;
　causing a prediction unit to predict a time necessary for the first processor to convert print data on the plurality of logical pages to be printed on a first print sheet into intermediate code if it is determined that the Nup layout is set by the determination unit;
　if the time predicted by the prediction unit is longer than a time that the image forming apparatus prints one print sheet, causing the first processor to convert print data of a predetermined logical page to be printed on the first print sheet into the intermediate code and causing the second processor to convert print data on a logical page other than the predetermined logical page to be printed on the first print sheet into the intermediate code; and
　if the time predicted by the prediction unit is shorter than the time that the image forming apparatus prints one print sheet, causing the first processor to convert print data on the plurality of logical pages to be printed on the first print sheet into the intermediate code and causing the second processor to convert print data on the plurality of logical pages to be printed on a second print sheet into the intermediate code.

7. A non-transitory computer-readable storage medium recording a program for causing a computer to execute a method for controlling an image forming apparatus, the method comprising:
　causing a first processor to convert input print data into an intermediate code;
　causing a second processor which is different from the first processor to convert the print data into the intermediate code;
　causing a determination unit to determine whether a Nup layout in which a plurality of logical pages is printed on one sheet is set to the print data;
　causing a prediction unit to predict a time necessary for the first processor to convert print data on the plurality of logical pages to be printed on a first print sheet into intermediate code if it is determined that the Nup layout is set by the determination unit;
　if the time predicted by the prediction unit is longer than a time that the image forming apparatus prints one print sheet, causing the first processor to convert print data of a predetermined logical page to be printed on the first print sheet into the intermediate code and causing the second processor to convert print data on a logical page other than the predetermined logical page to be printed on the first print sheet into the intermediate code; and
　if the time predicted by the prediction unit is shorter than the time that the image forming apparatus prints one print sheet, causing the first processor to convert print data on the plurality of logical pages to be printed on the first print sheet into the intermediate code and causing the second processor to convert print data on the plurality of logical pages to be printed on a second print sheet into the intermediate code.

* * * * *